United States Patent
Södö

(10) Patent No.: US 9,755,499 B2
(45) Date of Patent: Sep. 5, 2017

(54) ELECTRIC INTERFERENCE LIMITATION

(71) Applicant: VACON OYJ, Vaasa (FI)

(72) Inventor: Nicklas Södö, Vaasa (FI)

(73) Assignee: VACON OY, Vaasa (FI)

( * ) Notice: Subject to any disclaimer, the term of this patent is extended or adjusted under 35 U.S.C. 154(b) by 0 days.

(21) Appl. No.: 14/704,683

(22) Filed: May 5, 2015

(65) Prior Publication Data
US 2015/0340943 A1 Nov. 26, 2015

(30) Foreign Application Priority Data

May 21, 2014 (FI) .................................... 20145460

(51) Int. Cl.
H02P 1/04 (2006.01)
H02P 3/00 (2006.01)
H02M 1/12 (2006.01)
H02M 5/458 (2006.01)
H02M 1/08 (2006.01)
H02M 5/27 (2006.01)
H02P 23/26 (2016.01)

(52) U.S. Cl.
CPC ............... H02M 1/12 (2013.01); H02M 1/08 (2013.01); H02M 5/27 (2013.01); H02M 5/458 (2013.01); H02P 23/26 (2016.02); H02M 2001/123 (2013.01)

(58) Field of Classification Search
CPC .......... H02M 7/493; H02M 2001/325; H02M 5/4585; H02M 1/12; H02M 7/23; H02M 7/5387; H02M 1/126; H02M 1/32; H02M 2001/0048; H02M 2001/0058; H02M 3/155; H02M 5/458; H02M 1/44; H02M 7/5152; Y02E 10/07

USPC ...... 318/474, 700, 772, 801; 327/551, 5, 52; 363/47

See application file for complete search history.

(56) References Cited

U.S. PATENT DOCUMENTS 4,847,747 A * 7/1989 Abbondanti ........ H02M 7/5152
174/DIG. 16
5,459,386 A * 10/1995 Okachi ................... H02P 21/09
318/721

(Continued)

OTHER PUBLICATIONS

Experimental Verification of Common-Mode current Genration in Home Electrical Wiring in the Powerline Communications Band by A Rubinstein et al, 2001.*

(Continued)

*Primary Examiner* — Paul Ip
(74) *Attorney, Agent, or Firm* — Birch, Stewart, Kolasch & Birch, LLP

(57) ABSTRACT

A method and an arrangement for limiting the interference to a common electric power network, generated by a power electronics device, e.g. a frequency converter, which power electronics device comprises of at least one switch type component being able to change the output voltage value at a predefined permissible switching frequency range. The method comprises scanning through the permissible switching frequency range, recording measured common mode current values as a function of the switching frequency, and setting the final switching frequency of the switch type component out of a value where a local maximum value of the common mode current has been recorded.

13 Claims, 2 Drawing Sheets

(56) References Cited

U.S. PATENT DOCUMENTS

| | | | | |
|---|---|---|---|---|
| 5,632,000 A * | 5/1997 | Pabst | A61C 1/06 | 388/806 |
| 5,661,390 A * | 8/1997 | Lipo | H02M 1/44 | 318/492 |
| 5,990,654 A * | 11/1999 | Skibinski | H02M 1/126 | 307/105 |
| 6,008,616 A * | 12/1999 | Nagayama | B60L 11/1803 | 318/773 |
| 6,208,537 B1 * | 3/2001 | Skibinski | H02M 1/12 | 363/40 |
| 6,456,919 B1 * | 9/2002 | Korner | F16H 61/0213 | 701/55 |
| 6,559,616 B2 * | 5/2003 | Aoki | H02P 7/2805 | 318/567 |
| 6,566,839 B2 * | 5/2003 | DaSilva | H02P 8/32 | 310/68 R |
| 6,636,107 B2 * | 10/2003 | Pelly | H02M 1/12 | 327/552 |
| 6,775,157 B2 * | 8/2004 | Honda | H02M 1/12 | 363/39 |
| 6,794,929 B2 * | 9/2004 | Pelly | H02M 1/12 | 327/551 |
| 6,819,076 B2 * | 11/2004 | Takahashi | H02P 29/0038 | 318/671 |
| 6,870,347 B2 * | 3/2005 | Mizuno | H02P 6/34 | 318/722 |
| 6,917,271 B2 * | 7/2005 | Zhang | H02M 5/45 | 336/160 |
| 7,061,195 B2 * | 6/2006 | Ho | H02M 1/44 | 318/438 |
| 7,187,229 B2 * | 3/2007 | Pelly | H02M 1/12 | 327/551 |
| 7,274,241 B2 * | 9/2007 | Ho | H02M 1/44 | 327/170 |
| 7,385,438 B2 * | 6/2008 | Pelly | H02M 1/12 | 327/532 |
| 7,405,528 B2 * | 7/2008 | Ho | H02M 1/44 | 318/400.25 |
| 7,446,435 B2 * | 11/2008 | Zhang | H02M 1/12 | 307/105 |
| 7,535,133 B2 * | 5/2009 | Perreault | H02M 3/155 | 307/151 |
| 7,583,136 B2 * | 9/2009 | Pelly | H02M 1/12 | 327/532 |
| 7,738,267 B1 * | 6/2010 | Tallam | H02M 1/44 | 363/35 |
| 7,738,268 B2 * | 6/2010 | Baudesson | H02M 1/126 | 363/39 |
| 7,852,643 B2 * | 12/2010 | Zhang | H02M 5/4585 | 363/65 |
| 7,868,730 B2 * | 1/2011 | Lafontaine | H01F 17/062 | 336/229 |
| 7,881,081 B1 * | 2/2011 | Tallam | H02M 1/44 | 363/41 |
| 7,889,529 B2 * | 2/2011 | Asai | H02M 7/5387 | 323/284 |
| 7,928,592 B2 * | 4/2011 | Wagoner | H02M 7/493 | 290/44 |
| 7,939,959 B2 * | 5/2011 | Wagoner | H02M 5/458 | 290/55 |
| 7,944,068 B2 * | 5/2011 | Wagoner | H02J 3/38 | 290/44 |
| 7,957,166 B2 * | 6/2011 | Schnetzka | H02M 5/4585 | 363/40 |
| 7,994,799 B2 * | 8/2011 | Tachizaki | B60L 3/0023 | 324/551 |
| 8,023,234 B2 * | 9/2011 | Andersen | H02H 3/162 | 318/565 |
| 8,107,267 B2 * | 1/2012 | Tallam | H02M 1/44 | 363/127 |
| 8,115,444 B2 * | 2/2012 | De | H02P 27/08 | 318/801 |
| 8,138,620 B2 * | 3/2012 | Wagoner | H02M 5/4585 | 290/44 |
| 8,174,853 B2 * | 5/2012 | Kane | H02M 1/126 | 363/40 |
| 8,203,300 B2 * | 6/2012 | Krah | G05B 11/28 | 318/634 |
| 8,264,191 B1 * | 9/2012 | Ranganathan | H02P 1/26 | 318/727 |
| 8,373,952 B2 * | 2/2013 | Mirafzal | H02M 1/12 | 361/45 |
| 8,379,353 B2 * | 2/2013 | Andersen | H02H 3/162 | 361/42 |
| 8,379,363 B1 * | 2/2013 | Kolunthavelu | G11B 5/0245 | 360/137 |
| 8,401,822 B2 * | 3/2013 | Dimino | G01R 31/343 | 324/765.01 |
| 8,917,021 B2 * | 12/2014 | Takahashi | H02M 1/126 | 315/185 R |
| 2001/0026180 A1 * | 10/2001 | Aoki | H02P 7/2805 | 327/162 |
| 2001/0045863 A1 * | 11/2001 | Pelly | H02M 1/12 | 327/552 |
| 2002/0163319 A1 * | 11/2002 | Kaneko | B60L 11/1803 | 318/727 |
| 2003/0001532 A1 * | 1/2003 | DaSilva | H02P 8/32 | 318/432 |
| 2003/0042859 A1 * | 3/2003 | Gorti | H02P 6/085 | 318/275 |
| 2003/0132727 A1 * | 7/2003 | Mizuno | H02P 6/34 | 318/700 |
| 2004/0004514 A1 * | 1/2004 | Pelly | H02M 1/12 | 327/552 |
| 2004/0008527 A1 * | 1/2004 | Honda | H02M 1/12 | 363/39 |
| 2004/0041534 A1 * | 3/2004 | Takahashi | H02P 29/0038 | 318/671 |
| 2004/0130923 A1 * | 7/2004 | Yin Ho | H02M 1/44 | 363/131 |
| 2004/0196677 A1 * | 10/2004 | Zhang | H02M 5/45 | 363/71 |
| 2004/0207463 A1 * | 10/2004 | Pelly | H02M 1/12 | 327/552 |
| 2006/0043922 A1 * | 3/2006 | Baker | H02M 7/493 | 318/807 |
| 2006/0119303 A1 * | 6/2006 | Ho | H02M 1/44 | 318/438 |
| 2006/0186854 A1 * | 8/2006 | Ho | H02M 1/44 | 318/799 |
| 2007/0064457 A1 * | 3/2007 | Perreault | H02M 3/155 | 363/78 |
| 2007/0120607 A1 * | 5/2007 | Pelly | H02M 1/12 | 330/302 |
| 2007/0121353 A1 * | 5/2007 | Zhang | H02M 1/12 | 363/39 |
| 2007/0278988 A1 * | 12/2007 | De | H02P 27/08 | 318/801 |
| 2007/0296374 A1 * | 12/2007 | Baudesson | H02M 1/126 | 318/772 |
| 2008/0037298 A1 * | 2/2008 | Lafontaine | H01F 17/062 | 363/47 |
| 2008/0129238 A1 * | 6/2008 | Andersen | H02H 7/1227 | 318/565 |
| 2008/0174255 A1 * | 7/2008 | Schnetzka | F25B 49/025 | 318/12 |
| 2008/0180164 A1 * | 7/2008 | Pelly | H02M 1/12 | 327/552 |
| 2008/0284367 A1 * | 11/2008 | Kawashima | H02M 1/126 | 318/700 |
| 2009/0003020 A1 * | 1/2009 | Zhang | H02M 5/4585 | 363/65 |
| 2009/0052211 A1 * | 2/2009 | Asai | H02M 7/5387 | 363/56.05 |
| 2009/0109713 A1 * | 4/2009 | Schnetzka | H02M 7/003 | 363/34 |
| 2009/0134881 A1 * | 5/2009 | Tachizaki | B60L 3/0023 | 324/551 |

(56) References Cited

U.S. PATENT DOCUMENTS

| | | | | |
|---|---|---|---|---|
| 2009/0322081 A1* | 12/2009 | Wagoner | ............... | H02M 7/493 290/44 |
| 2009/0322082 A1* | 12/2009 | Wagoner | ............... | H02M 5/458 290/44 |
| 2009/0322083 A1* | 12/2009 | Wagoner | .................... | H02J 3/38 290/44 |
| 2010/0141198 A1* | 6/2010 | Krah | ....................... | G05B 11/28 318/636 |
| 2010/0172162 A1* | 7/2010 | Tallam | .................... | H02M 1/44 363/37 |
| 2010/0314872 A1* | 12/2010 | Wagoner | ............. | H02M 5/4585 290/44 |
| 2011/0141774 A1* | 6/2011 | Kane | ..................... | H02M 1/126 363/37 |
| 2011/0249368 A1* | 10/2011 | Andersen | ............... | H02H 3/162 361/23 |
| 2011/0257934 A1* | 10/2011 | Dimino | ................ | G01R 31/343 702/183 |
| 2011/0299308 A1* | 12/2011 | Cheng | .................... | H02M 1/44 363/37 |
| 2013/0016549 A1* | 1/2013 | Kieferndorf | .......... | H02M 7/487 363/131 |
| 2013/0193891 A1* | 8/2013 | Wood | ........................ | H02P 7/06 318/434 |
| 2013/0264987 A1* | 10/2013 | Uchida | .................. | H02K 7/145 318/495 |
| 2013/0301327 A1* | 11/2013 | Wagoner | ............... | H02M 1/126 363/132 |
| 2014/0070755 A1* | 3/2014 | Baek | ....................... | H02P 27/08 318/798 |
| 2014/0084791 A1* | 3/2014 | Takahashi | ............. | H02M 1/126 315/85 |
| 2014/0197765 A1* | 7/2014 | Kim | .................... | H02P 29/0038 318/400.2 |

OTHER PUBLICATIONS

Measuring Common-Mode Currents on Cables, by Henry Ott Consultants, Feb. 20, 2004.*

* cited by examiner

ELECTRIC INTERFERENCE LIMITATION

FIELD OF TECHNOLOGY

This invention relates to a method and arrangement for limiting the interference to a common electric power network, generated by a power electronics device, especially generated by a frequency converter.

BACKGROUND AND DESCRIPTION OF THE PRIOR ART

Power electronics is used in wide range of applications for controlling and converting of electric power. E.g. adjustable speed electric motor drives, consisting of a frequency converter controlled AC motor, are used widely in many industrial applications ranging from fractional kW to several MW power levels. Modern power electronic appliances are based on rapid semiconductor devices, e.g. insulated gate bipolar transistors (IGBT), used as switches in various power conversion topologies. It is always beneficial to have as low as possible internal power losses in a device, which is the reason for preferring fast components in power electronics.

The fast switching of a power component means fast voltage slope across it, which in turn gives rise to a current pulse through stray capacitances which in some measure always exist between circuits at different potentials. Most severe current of this kind is the current between an electric power distribution grid and the ground, excited by a power electronic appliance connected to the public network, due to that the high frequency ground current may be a source of interference to other electric devices connected to the same grid. This is why the ground current level of devices connected to the public network is regulated by international standards, e.g. IEC61800-3.

A normal way for limiting the ground current is to connect the power electronic appliance via a so-called common mode filter to the power supply network. This kind of a filter appears as a high impedance for common mode currents (cophasal currents in all network phases) but as a low impedance for differential mode currents (normal phase currents having sum value of 0).

Due to the formation mechanism of the ground current, its magnitude is normally the higher the higher is the switching frequency of the power components. Thus one possible method to limit ground currents is to limit the switching frequency of the power electronic devices.

In the complex impedance network of an electric installation, consisting e.g. of a supplying cable, a driving electric appliance (e.g. a frequency converter), a load cable and a load (e.g. an electric motor), there may be several frequencies where a part of the system is in resonance, i.e. frequencies where the local effective sum impedance has a very low value, comprising most of resistive components. At these frequencies the common mode current may be very high, causing e.g. overheating in the components at the current path.

SUMMARY OF THE INVENTION

The object of the present invention is to provide a novel method and arrangement for limiting the interference to a common electric power network, generated by a power electronic device. The objective is achieved by what is stated in the independent claims and other preferred embodiments of the invention are disclosed in the dependent claims.

The invention is based on the observation that the sum impedance of the system between the electric power network and the load depends on the parameters of the installation, and the impedance varies as a function of the frequency. Effective parameters of the installation in this sense are e.g. the serial inductances of the current conductors in power cables at both the network and load sides, the stray capacitances between the current conductors and the grounded screen of the power cables, stray capacitances inside the load (e.g. between motor windings and the grounded motor frame) etc. At certain frequencies a part of the system may be in resonance, where the effective sum impedance has a dip and the sum common mode current a peak, respectively.

According to an embodiment of the invention, the impedance of the installation, as a function of the frequency, is scanned by changing the switching frequency at which the output voltage of the power electric appliance is formed. Advantageously this is made so that the fundamental component of the output voltage is kept constant while sweeping through the whole permissible switching frequency range, and by recording the value of the common mode current (e.g. by measuring the sum value of all output phase currents) as a function of the switching frequency. The fundamental component of the output voltage may be DC or AC. Because the installation arrangement normally does not change after the start-up, the impedance scanning normally needs to be done only once, during commissioning.

According to an embodiment of the invention, the final switching frequency (frequency that is used during the normal operation of the device) is set to a value at which the common mode current is founded out to be at a low, preferably a local minimum value during the scanning, i.e. to a value at which the impedance of the installation is not in resonance. Local minimum in this context means a minimum value within a limited frequency range, e.g. between frequencies where local peak values of the common mode current have been detected.

According to an embodiment of the invention, the length of the load cable is determined on the basis of the scanned load impedance. This is possible when the impedance of the load (e.g. a motor) and the impedance of the cable as a function of the length are known.

According to the method and arrangement of the invention the resonance frequencies of the installation impedance can be avoided, thus resulting minimum common mode current, minimum warming effect on the components in the current path and minimum interference to other devices connected to the same power grid.

BRIEF DESCRIPTION OF THE DRAWINGS

Below the invention appears a more detailed explanation using examples with references to the enclosed figures, wherein.

DETAILED DESCRIPTION OF THE INVENTION

Figure 1:
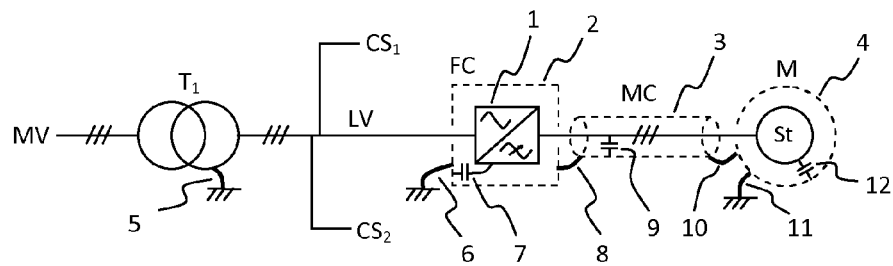
FIG. 1 presents an electric installation.

FIG. 1 presents an electric installation in a simplified one-line diagram form. MV means a medium voltage (e.g.

50 kV) power distribution grid, which is stepped down by a power by a transformer $T_1$ to a low voltage (e.g. 400 V) service voltage LV for a power electronics consumer FC and other end customers $CS_1$, $CS_2$, near the consumer location. The low voltage grid is normally grounded in the transformer (e.g. by connecting the star point of secondary windings to the ground by a wire 5).

The power electronics consumer in this example is a frequency converter FC, which is connected to a load motor M by a power cable MC. The frequency converter FC consists of a power electronics part 1 and an at least partly metallized housing 2, which is connected to ground by a wire 6. In this kind of installation a screened type power cable MC is normally used, and the screen is connected to the grounded metal housings at both ends by wires 8, 10. The motor metal housing is connected to ground locally by a wire 11. As is well known, all electric current conductors contain some serial stray inductances and some stray capacitances exist between all electric parts laying at different potentials. Normal values e.g. in a power cable may be a conductor serial inductance of about 0,2 mH/km and a stray capacitance between the conductor and the screen of about 0,6 µF/km. In FIG. 1 the stray capacitance of the cable is marked by symbol 9 but no stray inductances are drawn. Symbol 12 means the stray capacitance of the motor. Inside a frequency converter it is normal to connect a capacitor 7 between the power electronics part and the grounded frame due to EMC reasons.

Figure 2:
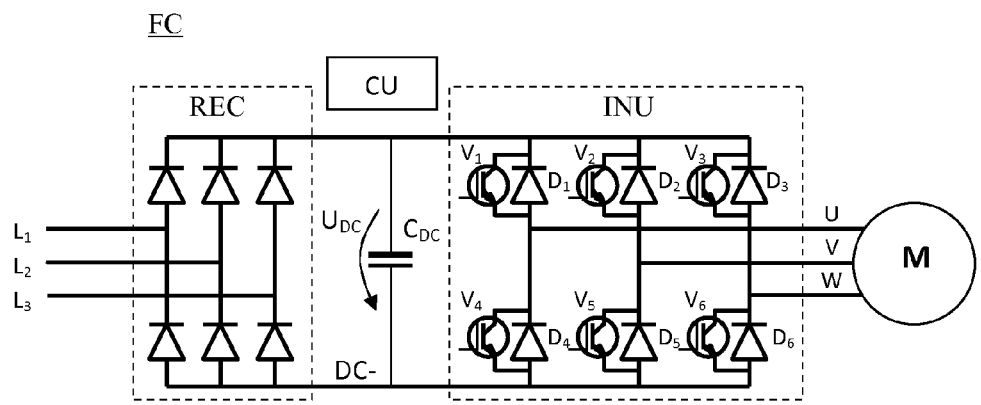
FIG. 2 presents a speed controlled motor drive.

FIG. 2 presents a main diagram of a known and typical variable speed motor drive, wherein a frequency converter FC is used to control the speed of an AC motor M. The frequency converter FC in this example contains a diode-bridge rectifier REC, rectifying the three-phase supply voltage $L_1$, $L_2$, $L_3$ into a constant DC-link voltage $U_{DC}$ which is smoothed by a capacitor $C_{DC}$, a three-phase inverter unit INU, consisting of IGBT-switches $V_1 \ldots V_6$ and freewheeling diodes $D_1 \ldots D_6$ and a control unit CU. An inductive component is normally used in either side of the rectifier, in order to filter the harmonics of the supply phase current, but it has been left out from the figure. The basic function of the inverter is to create a three-phase adjustable output voltage U, V, W for the motor M. Means for measuring the output phase currents are normally included in the inverter unit (not drawn). The filter capacitor 7, presented in FIG. 1, may be connected e.g. between the ground and the negative terminal DC- of the DC-link voltage.

Figure 3:
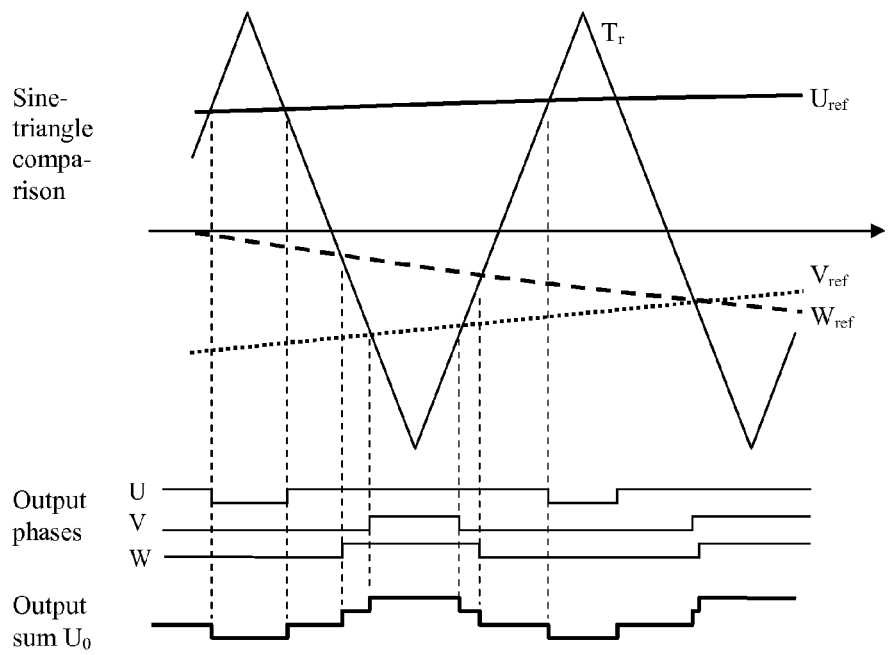
FIG. 3 illustrates voltage waveforms in a frequency converter.

FIG. 3 illustrates a known modulation method, called as sine-triangle comparison, for determining the output phase voltage positions of a frequency converter presented in FIG. 2. In the method each phase has its own sinusoidal reference signal $U_{ref}$, $V_{ref}$, $W_{ref}$, which are compared to a common triangle wave signal $T_r$. If the sine wave is higher than the triangle wave, the phase position is high and on the contrary (e.g. when $U_{ref}$ is higher than $T_r$ the IGBT $V_1$ in FIG. 2 is controlled to be in a conductive state). The triangle wave frequency is called as the switching frequency since every controllable IGBT switches are turned on and off at this frequency. As can be seen from FIG. 3 the average value of the output voltages ($U_0$) travels between the positive and negative DC-link voltage (see FIG. 2) at the switching frequency.

Figure 4:
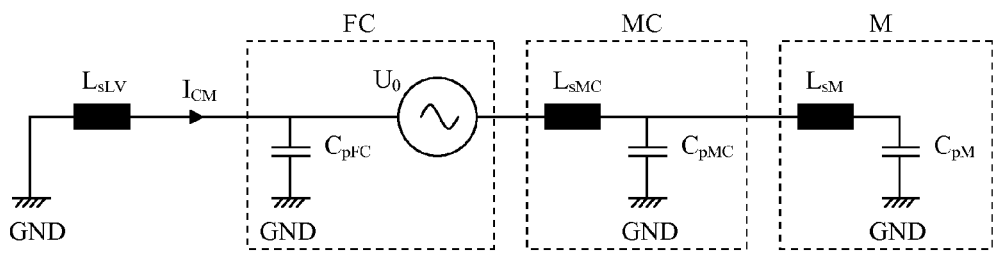
FIG. 4 presents an equivalent circuit of the electric installation.

FIG. 4 presents a simplified diagram of the electric installation from the common mode high frequency phenomena point of view. $U_0$ is the common mode voltage source, e.g. the sum of all three output phase voltages of the frequency converter FC as presented in FIG. 3, $C_{pFC}$ is the EMC filtering capacitor of FC and $L_{sLV}$ is the serial inductance of the electric power supplying grid. $L_{sMC}$ and $L_{sM}$ are the serial inductances of the cable MC and the motor M winding, $C_{pMC}$ is the stray capacitance between the cable conductors and the ground and $C_{pM}$ is the stray capacitance between the motor windings and the ground. In the figure only some of the possible load circuits are presented, in practice similar loads and other consumers affecting to the high frequency phenomena may exist even more.

Figure 5:
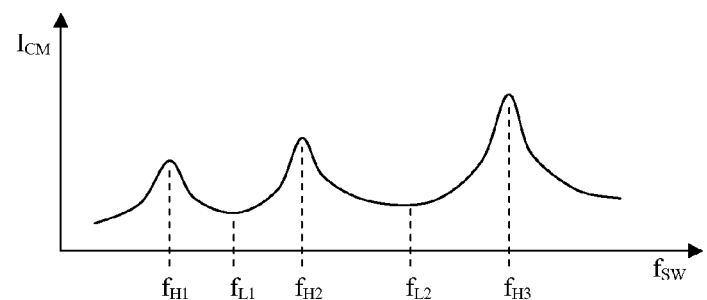
FIG. 5 illustrates a sum impedance curve of an electric installation.

FIG. 5 illustrates a characteristic behavior of the common mode current $I_{CM}$, measured at the coupling point to the low voltage power supply (see FIG. 4), as a function of the frequency of the common mode voltage generator $U_0$ (same as the switching frequency $f_{SW}$ of the IGBT switches as presented above). As is known, at the resonant frequency the absolute values of the impedances of serial connected inductance L and capacitance C are equal, thus compensating each other. At that frequency the total impedance is minimum.

Due to the fact that different L-C circuits may be in resonance at different frequencies, the common mode current $I_{CM}$ has peak values at each resonance frequencies ($f_{H1}$, $f_{H2}$, $f_{H3}$).

According to one embodiment of the present invention these resonant frequencies will be detected before starting the electric appliance, e.g. a frequency converter. The detection according to the present invention is performed by scanning through the permissible range of the switching frequency and recording simultaneously the magnitude of the common mode current. In one embodiment of the invention the scanning is performed by changing the switching frequency through the whole permissible switching frequency range with a continuous sweep and measuring the common mode current as a function of the switching frequency. In another embodiment of the invention the scanning is performed by measuring individual values of the common mode current by changing the switching frequency stepwise within the permissible switching frequency range. The final switching frequency is then set to a value where a high common mode current can be avoided, i.e. out of frequencies where local (i.e. within a certain part of the frequency range) maximum values of common mode current have been recorded ($f_{H1}$, $f_{H2}$, $f_{H3}$). In other words the final switching frequency of the switch type component can be set to a frequency value where measured common mode current doesn't have a peak value. In one embodiment of the invention it's preferable that the switching frequency is set to a value where the recorded common mode current has a local minimum value ($f_{L1}$, $f_{L2}$). In one embodiment of the invention the switching frequency is set to a value where the recorded common mode current has a minimum value, e.g. the smallest recorded value.

In some cases a sensed resonant frequency may be used in calculating a system component value, e.g. the length of the motor cable, when the impedance values of other components in the system are known.

While the invention has been described with reference to the previous embodiment, it should be recognized that the invention is not limited to this embodiment, and many modifications and variations will become apparent to persons skilled in the art without departing from the scope and spirit of the invention, as defined in the appended claims.

The invention claimed is:

1. A method of operating a control of a frequency converter, the method comprising:

connecting the frequency converter between a load and a common electric power network without a common mode filter;

connecting a current measurement circuit for measuring common mode current values between the electric power network and the frequency converter;

connecting a voltage measurement circuit for measuring the output voltages of the frequency converter;

scanning, via a control, through a permissible switching frequency range by changing a switching frequency of the at least one switch type component through a whole permissible switching frequency range, the switching frequency being frequency of an average value of the measured output voltages of the frequency converter;

recording, via the control, the measured common mode current values as a function of the switching frequency;

setting a switching frequency of at least one switch type component of the frequency converter;

changing the output value of the at least one switching type component at a predetermined permissible switching frequency range; and setting, via the control, a final switching frequency of the at least one switch type component to a frequency value where a local minimum value of the common mode current has been recorded.

2. A method according to claim 1, wherein the common mode current values are recorded while scanning, via the control, through the permissible switching frequency range before starting the frequency converter.

3. A method according to claim 2, wherein during the scanning, via the control, through the permissible switching frequency range the fundamental component of the AC or DC output voltage is kept constant.

4. A method according to claim 1, wherein during the scanning, via the control, through the permissible switching frequency range the fundamental component of the AC or DC output voltage is kept constant.

5. A method according to claim 1, wherein the switching frequency scanning, via the control, is performed with a continuous sweep over the permissible switching frequency range.

6. A method according to claim 1, wherein the switching frequency scanning, via the control, is performed by changing the switching frequency stepwise over the permissible switching frequency range.

7. A method according to claim 1, wherein the frequency value, where a local peak value of the common mode current is detected, via the control, is used in calculating a length of the motor cable, when the impedance values of other components in the system are known.

8. A control system comprising a control of a frequency converter the frequency converter is connected between a load and a common electric power network without a common mode filter, a current measurement circuit for measuring common mode current values is connected between the electric power network and the frequency converter, a voltage measurement circuit is connected to the output of the frequency converter for measuring the output voltages of the frequency converter, wherein the control is configured to:

scan through a permissible switching frequency range, by changing a switching frequency of the at least one switch type component through a whole permissible switching frequency range, the switching frequency being frequency of an average value of the measured output voltages of the frequency converter, record the measured common mode current values as a function of the switching frequency, set a switching frequency of at least one switch type component of the frequency converter, change the output value of the at least one switching type component at a predetermined permissible switching frequency range, and set a final switching frequency of the at least one switch type component to a frequency value where a local minimum value of the common mode current has been recorded.

9. A control according to claim 8, wherein the control is configured to record the common mode current values while scanning through the permissible switching frequency range before starting the frequency converter.

10. A control according to claim 8, wherein during the scanning the control is configured to keep the fundamental component of the output voltage constant.

11. A control according to claim 8, wherein the control is configured to scan the switching frequency range with a continuous sweep over the permissible switching frequency range.

12. A control according to claim 8, wherein the control is configured to scan the switching frequency range stepwise over the permissible switching frequency range.

13. A control according to claim 8, wherein the control is configured to use the switching frequency value, where a local peak value of the common mode current is detected, in calculating a length of the motor cable, when the impedance values of other components in the system are known.

* * * * *